May 23, 1961 D. M. CHAUVIN 2,985,847
HIGH STABILITY TRANSISTOR OSCILLATOR
Filed June 24, 1957
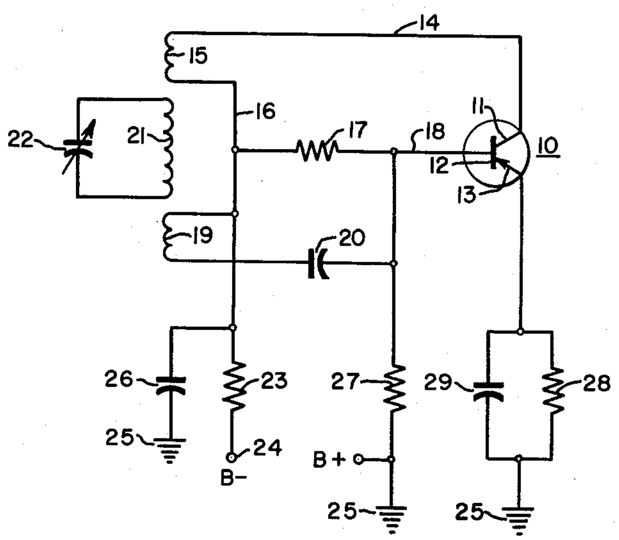
WITNESSES:
Bernard R. Gieguez
Leon J. Toga
INVENTOR
David M. Chauvin
BY Maury I. Hull
ATTORNEY 2,985,847
Patented May 23, 1961

2,985,847

HIGH STABILITY TRANSISTOR OSCILLATOR

David M. Chauvin, Glen Burnie, Md., assignor to Westinghouse Electric Corporation, East Pittsburgh, Pa., a corporation of Pennsylvania Filed June 24, 1957, Ser. No. 667,616
3 Claims. (Cl. 331—117)

This invention relates to transistor oscillators, and more particularly to transistor oscillators having high frequency stability.

In prior art transistor oscillators, difficulty is frequently encountered in providing stable operation because of the large influence of the internal parameters of the transistor.

The oscillator of the instant invention overcomes this and other disadvantages by utilizing input and output circuits having natural resonant frequencies above the alpha cut-off frequency of the transistor, to provide for increased frequency stability.

Accordingly, an object of the invention is to provide a new and improved transistor oscillator.

Another object is to provide a new and improved transistor oscillator with improved frequency stability.

A further object is to provide a new and improved transistor oscillator in which the electrophysical properties of the semiconductor are utilized to provide increased frequency stability.

Other objects and advantages will become apparent after a perusal of the following specification when read in connection with the accompanying drawing, in which the single figure thereof is a schematic electrical circuit diagram of a stable transistor oscillator constructed according to the preferred embodiment of the invention.

There is shown at 10 a triode transistor which is preferably of the p-n-p type and may be of a type known in the trade as 2N112 and having a collector 11, base 12 and emitter 13. The collector 11 is connected by way of lead 14 to one terminal of an inductor 15, the other terminal of the inductor 15 being connected by way of lead 16 to one terminal of a resistor 17, the other terminal of resistor 17 being connected by way of lead 18 to the aforementioned base 12. The aforementioned lead 16 is connected to one terminal of a second inductor 19, the other terminal of the inductor 19 being connected to one terminal of a capacitor 20, the other terminal of the capacitor 20 being connected to lead 18. Mutually coupled to the aforementioned inductors 15 and 19 is a third inductor 21 having connected thereacross a variable capacitor 22 for tuning the circuit to the desired resonant frequency. The aforementioned lead 16 is connected by way of a resistor 23 to a terminal 24 which is connected to the negative terminal of a suitable source of direct current potential, not shown, the positive terminal of the source of direct current potential being connected to ground 25. Aforementioned lead 16 is also connected by way of capacitor 26 to ground 25. Aforementioned lead 18 is also connected by way of resistor 27 to ground 25, and the aforementioned emitter 13 of triode transistor 10 is connected by way of resistor 28 to ground 25, resistor 28 having capacitor 29 connected in parallel therewith. The useful output of the oscillator circuit is developed across the tank circuit including inductor 21 and capacitor 22, but useful power may be obtained from other points in the circuit, in a manner which will be apparent to those skilled in the art.

The operation of the above-described circuit can be most easily understood by comparing it with the operation of a well known vacuum tube oscillator circuit known in the art as a Meissner circuit. In a conventional triode vacuum tube Meissner oscillator circuit, a pair of untuned coils, one of these being in the anode circuit and the other in the grid circuit are employed, these untuned coils being coupled to a circuit which is tuned, the latter circuit being sometimes referred to as the tank circuit and usually comprising the circuit where the useable on frequency power output of the oscillator is developed.

In practice, the vacuum tube Meissner oscillator circuit may be characterized by a degree of frequency instability since the feedback coils form a resonant tank circuit of their own with the tube and circuit stray capacities, and spurious or parasitic oscillations may occur. Some improvement in frequency stability may be provided by reducing the number of turns of the inductors in the grid and anode circuits which moves the frequency of any unwanted oscillations higher in the frequency spectrum, but reduction in the number of turns in these circuits results in a decrease in circuit efficiency. Another expedient is to employ extra circuit damping, but there is also a loss of efficiency when this is employed.

In the stable transistor oscillator circuit of the instant invention, advantage is taken of the fact that the transistor 10 as an amplifier is less efficient as the frequency is increased. In the transistor this reduction in gain as the frequency is increased is a result of the electrophysics of a semiconductor when used as an active electronic device, in that, as the frequency is increased there is a greater inability for recombination of current carriers (electrons or holes as the case may be). For the transistor, a gain point caused by this phenomenon is usually described as the alpha cut-off frequency. The alpha cut-off frequency is more fully discussed in the literature of the art, for example, in Electronic and Radio Engineering, ch. 21, by F. E. Terman, 4th ed., McGraw-Hill Pub. Co., 1955. Preferably, in constructing the transistor circuit of the instant invention, the aforementioned feedback coils 15 and 19 are made of such sizes or inductance values that the self-resonance of these parts of the circuit is much above the alpha cut-off frequency. This is accomplished while still providing more than sufficient feedback or magnetic coupling to provide for vigorous oscillations in the main tank of the circuit comprising inductor 21 and capacitor 22. Furthermore, the low inductance values of inductors 15 and 19 renders any changes in transistor parameters less influential on frequency stability.

The operation of the oscillator circuit of the instant invention will be readily understood by those skilled in the art. An input circuit including coil 19 operatively connects the base 12 and emitter 13. An output circuit including coil 15 operatively connects emitter 13 and collector 11. Feedbacks of sufficient energy of the proper phase through tank inductor 21 from the output circuit to the input circuit results in the generation of oscillations.

Assuming, by way of illustration, that it is desired to use the transistor oscillator circuit as a local oscillator in a radio receiver for receiving the broadcast band with an I.F. 455 kc., inductor 21 may be a universally wound coil having a core diameter of approximately 0.25 inch and may have a value of 0.23 millihenry, inductors 15 and 19 may each be a few, for example, ten turns on either side of the inductor 21, capacitor 22 may have a maximum value of 100 micromicrofarads, resistor 17 may have a value of 6.8 kilohms, capacitor 20 may have a value of 1000 micromicrofarads, capacitor 26 may have a value of 0.1 microfarad, resistor 23 may have a value of 470 ohms, resistor 27 may have a value of 27 kilohms, resistor 28 may have a value of 2.2 kilohms, capacitor 29 may have a value of 0.1 microfarad, and the voltage source between the aforementioned terminal 24 and ground 25 may be of the order of 6 volts.

Preferably, inductors 15 and 19 are so disposed or spaced with respect to each other that the direct coupling between these two coils approaches zero or is maintained at a very low value, coupling being provided through the intermediary of coil 21.

There has been provided then, a stable transistor oscillator circuit well suited to perform the hereinbefore announced objectives of the invention.

Whereas the invention has been shown and described with reference to a circuit of the general "common-emitter" type, the principles of transistor oscillator frequency stability taught herein are applicable to oscillator circuits of the grounded or common base type and to circuits of the common collector type, and the invention contemplates the use of circuits of these types.

Whereas a transistor of the p-n-p type has been shown and described, a transistor of the n-p-n type could be employed if desired.

Whereas the invention has been shown and described with reference to a preferred embodiment thereof which gives satisfactory results, it should be understood that changes may be made and equivalents substituted without departing from the spirit and scope of the invention.

I claim as my invention:

1. A frequency stabilized transistor oscillator comprising, in combination, a transistor triode having a collector, base and emitter, said transistor having a preselected alpha cut-off frequency, circuit means including a first inductor operatively connecting said emitter and base to provide an input circuit, other circuit means including a second inductor operatively connecting said collector to said emitter to provide an output circuit, and tuned circuit means including a third inductor coupled to both said first and second inductors, said tuned circuit means providing for the feedback of energy from said output circuit to said input circuit, the resonant frequency of said first inductor and the shunting internal capacity of the transistor thereacross being above said alpha cut-off frequency, the resonant frequency of said second inductor and the shunting internal capacity of the transistor thereacross also being above said alpha cut-off frequency.

2. A stabilized transistor oscillator comprising, in combination, a junction transistor having a collector, base and emitter, said junction transistor having a preselected alpha cut-off frequency, first circuit means including a first inductor operatively connecting said base to said emitter, said first circuit means having a natural resonant frequency above said alpha cut-off frequency, second circuit means including a second inductor operatively connecting said collector and emitter, said second circuit means also having a natural resonant frequency above said alpha cut-off frequency, and other inductor means having mutual coupling with said first and second inductor means and providing for the feedback of energy from the second circuit means to the first circuit means to thereby provide for the generation of oscillations by said transistor.

3. A frequency stabilized transistor oscillator comprising, in combination, a transistor having at least three elements including a base, emitter, and collector, said triode transistor having a preselected alpha cut-off frequency, input circuit means including a first inductor and operatively connecting two elements of said three elements, output circuit means including a second inductor and operatively connecting the third element and one of said two elements, each of said input circuit means and output circuit means alone having a natural resonant frequency above said alpha cut-off frequency, and other tuned inductor means inductively coupled to both said first and second inductors to provide for the feedback of energy from the output circuit means to the input circuit means to thereby provide for the generation of oscillations by said transistor.

References Cited in the file of this patent

UNITED STATES PATENTS

| | | |
|---|---|---|
| 1,924,796 | Meissner | Aug. 29, 1933 |
| 2,757,287 | Stanley | July 31, 1956 |
| 2,791,693 | Moore | May 7, 1957 |
| 2,812,436 | Overbeek | Nov. 5, 1957 |

FOREIGN PATENTS

| | | |
|---|---|---|
| 413,152 | Germany | Oct. 25, 1956 |
| 697,168 | Great Britain | Sept. 16, 1953 |

OTHER REFERENCES

Pages 84 and 85 of "Transistor Circuit Handbook," by Garner, copyright 1956; published by Coyne Electrical School, Chicago 12, Illinois.